Patented Aug. 12, 1924.

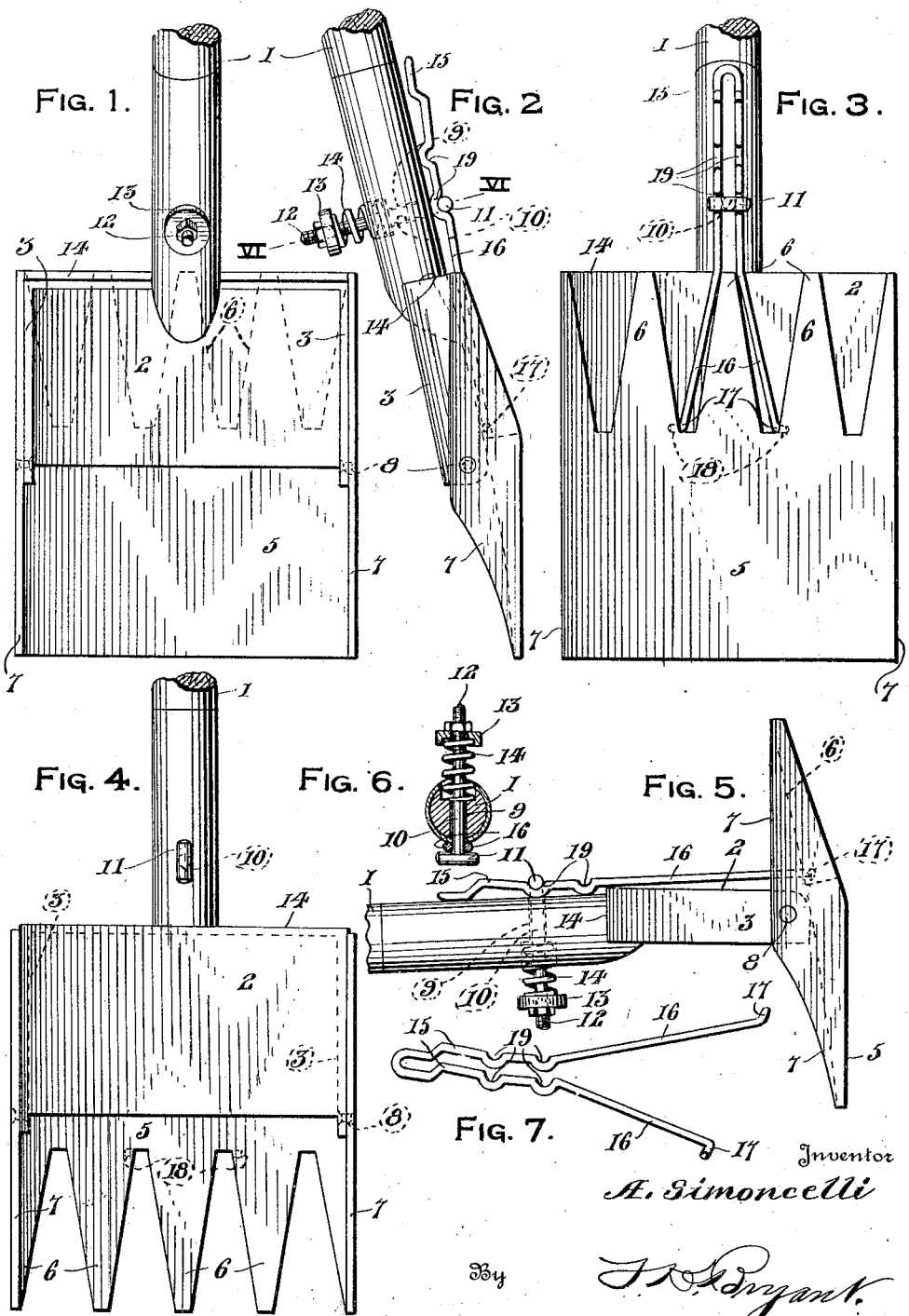

1,504,913

UNITED STATES PATENT OFFICE.

ANSELMO SIMONCELLI, OF SILVERBOW, MONTANA, ASSIGNOR OF ONE-HALF TO DOMENICA GIRARDI, OF BUTTE, MONTANA.

COMBINED HOE, RAKE, AND SHOVEL.

Application filed April 18, 1923. Serial No. 632,945.

*To all whom it may concern:*

Be known that I, ANSELMO SIMONCELLI, a citizen of the United States of America, residing at Silverbow, in the county of Silver Bow and State of Montana, have invented certain new and useful Improvements in Combined Hoes, Rakes, and Shovels, of which the following is a specification.

This invention relates to a combined hoe, rake and shovel and has for a primary object to provide a single implement head adjustably mounted upon the outer end of a handle bar and so constructed to perform the functions of a hoe, rake or shovel.

Another object of the invention is to provide a single implement head for the purposes above set forth having associated therewith means for holding the head in adjusted positions when the same is desired for use for certain purposes.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a top plan view, partly broken away, of a combined hoe, rake and shovel, the implement being set up in its form of shovel, Figure 2 is a side elevational view of the device showing the mechanism for retaining the implement head in its set position, Figure 3 is a bottom plan view of the device as shown in Fig. 1, Figure 4 is a bottom plan view of the device, similar to Fig. 3 with the implement head shifted to its position for use as a pitch fork or the like, Figure 5 is a side elevational view showing the implement head in position for use as a hoe or rake, Figure 6 is a detail sectional view taken on line VI—VI of Fig. 2 showing the latch or holding mechanism for retaining the implement head in its adjusted position, and Figure 7 is a perspective view of the link connecting the implement head to the head positioning mechanism.

Referring more in detail to the accompanying drawing, there is illustrated a combined hoe, rake and shovel embodying a handle 1 of the usual length having rigidly connected to the outer end thereof, a head section 2 having side flanges 3 and a rear flange 4.

A single implement head capable of use as a hoe, rake or shovel is pivotally supported upon the forward ends of the side flanges 3 of the rigid head section 2, the implement head embodying a flat bottom plate 5 having a series of rake teeth 6 formed at one end thereof and having side flanges 7 that inclose the side flanges 3 as shown in Figs. 1 and 2 with the contacting flanges pivoted as at 8. The movable head 5 is disposed beneath the rigid head 2 and has devices associated therewith, and also with the handle 1 for retaining the same in different positions.

The handle 1 is provided with a cross bore 9 through which a bolt 10 slidably extends, the projecting end of the bolt adjacent the lower side of the rigid head 2 being provided with a cross or T-head 11 while the opposite end thereof is threaded as at 12 for the reception of a nut 13, a coil spring 14 surrounding the bolt between the handle 1 and nut 13 for placing the head 11 thereof under tension and drawing the same in a direction toward the handle bar as clearly shown in Fig. 6, tension on the spring 14 being regulated by adjusting the nut 13. A link member formed of a rod bent upon itself to provide spaced side legs 15 is associated with the movable head 5 and the head of the bolt 10, the free ends of the side bars 15 being bent outwardly as at 16 and provided with pins 17 upon the free ends thereof that are received in sockets 18 formed at the bases of the rack teeth 6 as shown in Fig. 4. The side legs 15 of the link rod are provided with transversely alined depressed portions 19 providing sockets in which the T-head 11 of the bolt 10 is received, the link rod being positioned at the lower side of the rigid bottom 2 with the side legs 15 extending in position adjacent the outer end of the handle 1 as shown in Figs. 2, 3 and 5 with the headed end of the bolt 10 projecting between the legs as illustrated.

When it is desired to use the device as a shovel, the movable head 5 is shifted upon its pivot point 8 to present the rake teeth 5 adjacent the bottom wall of the rigid head 2 with the plate section 5 of the movable head forwardly positioned as shown in Figs. 1 to 3 for use as a shovel. With the movable head so positioned, the T-head 11 has the projecting ends thereof received in the notches 19 in the side legs of the link rod which securely hold the movable head. When it is desired to use the device as a rake or hoe, the movable head is shifted upon its pivot point 8 to the position shown in Fig. 5, the link rod being moved therewith while the head is so retained by the tensioned bolt 10 as shown in Fig. 4. It is also possible to use the device as a fork, as shown in Fig. 4, and in this position, the link rod may be removed and the movable head shifted to a reverse position from that shown in Figs. 1 and 3 with the teeth 6 forwardly positioned as shown.

While there is herein shown and described the preferred embodiment of the present invention, it is nevertheless to be understood that minor changes may be made therein without departing from the spirit and scope of the invention as claimed.

What is claimed as new is:—

1. In a device of the class described, a handle, a head having upstanding side flanges carried by said handle, a blade having upstanding side flanges, means for pivotally connecting the side flanges of said head and blade, a link pivotally connected to said blade, and means carried by said handle adapted to engage said link for retaining the blade in different angular positions in respect to the axis of said handle.

2. In a device of the class described, a handle, a head on said handle having upstanding rear and side flanges, a blade pivotally connected to the side flanges of said head, a substantially U-shaped link pivotally connected to said blade, and a resilient clamping means carried by said handle adapted to engage said link for retaining said blade at different angles in respect to said handle.

3. In a device of the class described, a handle, a head on said handle having upstanding rear and side flanges, a blade pivotally connected to the side flanges of said head, a substantially U-shaped link having a series of depressions pivotally connected to said blade, and a resilient clamping member carried by said handle for selectively engaging the depressions in said link for retaining said blade at different angles in respect to the axis of said handle.

4. In a device of the class described, a handle, a head on said handle having a bottom wall and vertical rear and side walls, a blade having a bottom and vertical side walls, means for pivotally connecting the side walls of said head and blade, a link formed of a strand of wire bent upon itself pivotally connected to said blade, and means carried by said handle adapted to engage said link for retaining the blade in different angular positions in respect to the plane occupied by the head.

5. In a device of the class described, a handle having a cross bore, a head having upstanding side and rear flanges rigidly carried by said handle, a blade having upstanding side flanges pivotally connected to the side flanges of said head, a substantially U-shaped link having equi-spaced depressions pivotally carried by said blade, and a resiliently mounted T-shaped bolt positioned in the cross bore of said handle adapted for engaging the depressions in said link for retaining said blade at different angular positions in respect to the longitudinal axis of said handle.

6. In a device of the class described, a handle having a cross bore, a head rigidly carried by said handle, a blade pivotally connected to said head, a substantially U-shaped link having a series of equi-spaced depressions pivotally carried by said blade, a bolt having a T-shaped head slidably positioned in the cross bore of said handle with its T-shaped head adapted to selectively engage the depressions in said link, and a spring encircling said bolt on the opposite side of the handle to said T-shaped head for moving said bolt through said cross bore to cause the substantially U-shaped link to be clamped against the side of the handle.

In testimony whereof I affix my signature.

ANSELMO SIMONCELLI.